United States Patent [19]

Aonuma et al.

[11] Patent Number: 4,847,147
[45] Date of Patent: Jul. 11, 1989

[54] MAGNETIC RECORDING MEDIUM

[75] Inventors: Masashi Aonuma; Masaaki Suzuki; Yasuo Tamai, all of Kanagawa, Japan

[73] Assignee: Fuji Photo Film Co., Ltd., Kanagawa, Japan

[21] Appl. No.: 129,922

[22] Filed: Dec. 3, 1987

Related U.S. Application Data

[63] Continuation of Ser. No. 883,434, Jul. 14, 1986, abandoned, which is a continuation of Ser. No. 678,440, Dec. 5, 1984, abandoned.

[30] Foreign Application Priority Data

Dec. 6, 1983 [JP] Japan ................................ 58-230378

[51] Int. Cl.$^4$ ............................................. G11B 5/70
[52] U.S. Cl. ..................................... 428/329; 428/336; 428/694; 428/900
[58] Field of Search ............... 428/694, 695, 900, 329, 428/336

[56] References Cited

U.S. PATENT DOCUMENTS

| | | | |
|---|---|---|---|
| 4,109,046 | 8/1978 | Hammon et al. | 428/328 |
| 4,500,599 | 2/1985 | Ogawa et al. | 428/694 |
| 4,506,000 | 3/1985 | Kubota | 428/694 |
| 4,506,000 | 3/1985 | Kubota et al. | 428/694 |
| 4,547,425 | 10/1985 | Narnse | 428/329 |

FOREIGN PATENT DOCUMENTS

| | | |
|---|---|---|
| 30608 | 8/1973 | Japan . |
| 56231 | 4/1983 | Japan . |
| 70426 | 4/1983 | Japan . |
| 70429 | 4/1983 | Japan . |
| 2101911 | 1/1983 | United Kingdom . |
| 2118070 | 10/1983 | United Kingdom . |
| 2119284 | 11/1983 | United Kingdom . |
| 2119284 | 11/1983 | United Kingdom . |

*Primary Examiner*—Paul J. Thibodeau
*Attorney, Agent, or Firm*—Sughrue, Mion, Zinn, Macpeak, and Seas

[57] ABSTRACT

A magnetic recording medium is disclosed which comprises a non-magnetic support having coated thereon two magnetic layers, wherein an under layer of the magnetic layers contains ferromagnetic metal particles having a coercive force of 550 to 700 Oe, and wherein an upper layer of the magnetic layers contains a ferromagnetic particles having a specific surface area determined by the BET method of 25 to 35 m$^2$/g, a coercive force of 700 to 800 Oe and a thickness of 0.5 to 2.5 μm, wherein the entire magnetic layer including the upper layer and the under layer have a coervice force of 580 to 750 Oe, a residual magnetic flux density of 2200 to 3200 gauss and a thickness of 3.0 to 5.0 μm.

25 Claims, No Drawings

MAGNETIC RECORDING MEDIUM

This is a Continuation, of application Ser. No. 06/883,434 filed July 14, 1986 and now abandoned, which is a Continuation of application Ser. No. 06/678,440 filed Dec. 5, 1984 now abandoned.

FIELD OF THE INVENTION

The present invention relates to a magnetic recording medium, more particularly to a magnetic recording medium which is suitable as a magnetic audio recording cassette tape used at a high position which has an excellent reproduction output at all frequency bands, and is capable of maintaining low noise.

BACKGROUND OF THE INVENTION

Magnetic recording media, particularly magnetic audio recording compact cassette tapes (hereinafter "cassette tape") have recently been developed so as to possess higher capcaity, and improved sensitivity, frequency characteristics, MOL (maximum output level), SOL (saturated output level) and dynamic range which are attained by maintaining noise low. A cassette tape has been developed so that a tape can be used at a metal position, at a normal position and at a high position.

Heretofore, audio cassette tapes used at a high position contain chromium dioxide, Co-coated or Co-doped iron oxide as a magnetic particle, and have a single magnetic layer structure or a multi magnetic layer structure. A tape which is used at a high position and has a coercive force (Hc) of 560 to 680 Oe, residual magnetic flux density (Br) of 1400 to 1900 gauss has been studied and researched.

A ferromagnetic metal particle having a larger magnetic moment than a conventional magnetic particle has recently been studied and researched (e.g., Japanese Patent Application (OPI) No. 64629/83). (The term "OPI" as used herein refers to a "published unexamined Japanese Patent Application".)

Further, a magnetic recording medium containing a ferromagnetic metal particle and having a multi-layer structure is disclosed in U.S. Pat. No. 4,246,316 and Japanese Patent Application (OPI) Nos. 54002/78 and 143735/82.

However, this type of a magnetic recording medium has disadvantages in that the frequency characteristic is not well balanced, the output at a low frequency region (MOL) is poor, the squareness ratio is low and demagnetization is high.

Extensive researches have been made on ferromagnetic metal particles, characteristics of an under layer and an upper layer of a magnetic layer, and characteristics of an entire magnetic layer including an upper layer and an under layer in a magnetic recording medium of a multi-layer structure. As a result thereof, it has now been found that the above-described problems can be solved by a magnetic recording medium having a magnetic layer of a multi-layer structure containing ferromagnetic metal particles which have a predetermined specific surface area determined by a BET method, and having a predetermined relationship of coercive force as well as a residual magnetic flux density between the multi-layers of a magnetic layer.

SUMMARY OF THE INVENTION

An object of the present invention is to provide a magnetic recording medium having an excellent reproduction output at all frequency band regions, maintaining the same bias noise as that of normal iron oxide at a high position and having well balanced frequency characteristics.

Another object of the present invention is to provide a magnetic recording medium having a high squareness ratio and low demagnetization.

The above objects of the invention can be attained by a magnetic recording medium comprising a nonmagnetic support having coated thereon two magnetic layers, an under layer of the magnetic layers containing a ferromagnetic metal particles having a coercive force of 550 to 700 Oe, an upper layer of the magnetic layers containing ferromagnetic metal particles having a specific surface area determined by a BET method of 25 to 35 $m^2/g$ and a coercive force to 700 to 800 Oe and a thickness of 0.5 to 2.5 $\mu m$, wherein the entire magnetic layer including the upper layer and the under layer has a coercive force of 580 to 750 Oe, a residual magnetic flux density of 2200 to 3200 gauss and a thickness of 3.0 to 5.0 $\mu m$.

DETAILED DESCRIPTION OF THE INVENTION

The specific surface area, determined by a BET method, of the ferromagnetic metal particles contained in the under layer of the magnetic layer of the present invention can be selected optionally, but is preferably adjusted to 20 to 30 $m^2/g$ and more preferably 23 to 30 $m^2/g$. The saturation magnetization $\sigma s$ can be selected optionally, but is preferably adjusted to 130 emu/g or more and more preferably 130 to 170 emu/g. It is important that the under layer of the magnetic layer has a coercive force of 550 to 700 Oe and preferably 550 to 690 Oe. If the coercive force is 550 Oe or less, the sensitivity at a low frequency region becomes too high and frequency characteristics can not be well balanced even though the coercive force of the upper layer is controlled. Therefore, such a magnetic tape is not suitable to be used at a high position of audio tape recorders (deck). On the other hand, if the coercive force is 700 Oe or more, the frequency characteristics can not be well balanced even though that of the upper magnetic layer is controlled. In this case, there is a problem that the bias is too strong at a high position.

The thickness of the under magnetic layer is not limited, but is preferably 2.0 to 4.5 $\mu m$ and more preferably 2.0 to 4.0 $\mu m$, and is preferably adjusted so that the residual magnetic flux is 0.5 to 1.5 MAXWELL/cm, preferably 0.8 to 1.3 MAXWELL/cm. In order to keep the balance of the frequency characteristics, it is important to increase the residual magnetic flux density as the coercive force of the under magnetic layer increases.

The ferromagnetic particles used for the upper magnetic layer have a specific surface area of 25 to 35 $m^2/g$ and preferably 28 to 35 $m^2/g$, and more preferably 30 to 35 $m^2/g$ determined by the BET method using an apparatus "Quantasorb" (trade name manufactured by Quantachrome Co.). If the specific surface area is less than 25 $m^2/g$, the bias noise of the resulting tape is too high and the dynamic range cannot be enlarged. On the other hand, if the specific surface area is more than 35 $m^2/g$, weather resistance of the ferromagnetic metal particles is deteriorated, the stability of a resulting tape with passage of time is deteriorated and the squareness ratio is decreased. A magnetic recording tape having a coercive force and saturation magnetization which are necessary for the upper magnetic layer cannot be produced on an industrial scale, if the ferromagnetic metal particles have a specific surface area of less than 25 m²/g or more than 35 m²/g.

It is important that the upper magnetic layer has a coercive force of 700 to 800 Oe preferably 720 to 800 Oe and more preferably 730 to 800 Oe. If the coercive force is less than 700 Oe, the sensitivity in a low frequency region is good, but the sensitivity in the high frequency region is poor. Therefore, the frequency characteristics cannot be well balanced, and the resulting tape is not suitably used at a high position. On the other than, if the coercive force of the upper magnetic layer is more than 800 Oe, it does not balance well with that of the under layer in terms of the frequency characteristics. That is, the sensitivity in the high and low frequency regions is sufficiently high, but that in the middle frequency region is low and the frequency characteristics are not balanced well. Therefore, the resulting tape is not suitable as a magnetic recording medium.

It is important that the upper magnetic layer has a thickness of 2.5 μm or less. The minimum thickness can be 0.1 μm, but it is technically difficult to produce the upper magnetic layer having a thickness of 0.1 μm. Therefore, the thickness of the upper magnetic layer is preferably 0.5 μm or more and more preferably 0.8 to 2.5 μm. If the thickness of the upper magnetic layer is more than 2.5 μm, the sensitivity in the low frequency region is short and the frequency characteristics are not balanced well. Therefore the effect of the present invention cannot be obtained.

Another important characteristic of the upper magnetic layer is the surface smoothness of a tape. The surface smoothness property is evaluated by the degree of surface gloss. The surface gloss of a tape having a cassette width in a machine direction is not less than 50, preferably not less than 80. The value of the surface gloss was measured at an angle of 45° by a cassette type digital gloss meter "KG-45D", a trade name, manufactured by Suga Shikenki Co., Ltd. according to the method prescribed in JIS K7105 and JIS K8741.

With a surface gloss of not higher than 50, it is difficult to markedly improve the reproduction output at all band regions, which is a main feature of the present invention, even though a magnetic layer has an upper layer and an under layer.

The tape characteristics of the magnetic recording medium including an upper layer and an under layer are such that the coercive force is 580 to 750 Oe, preferably 590 to 740 Oe and more preferably 600 to 720 Oe and the residual magnetic flux density is 2200 to 3200 gauss, preferably 2200 to 3100 and more preferably 2300 to 3000 gauss. The squareness ratio (Br/Bm) is preferably 0.80 or more, more preferably 0.82 and most preferably 0.85 or more. The thickness of an upper layer and an under layer must be adjusted so that the total thickness of a magnetic layer is within the range of 3.0 to 5.0 μm and more preferably 3.0 to 4.8 μm. As a result thereof, a mgnetic recording medium having an excellent reproduction output at all band regions, maintaining noise low, which is suitable to be used at a high position, can be obtained.

The ferromagnetic metal particles used in the present invention can be prepared by a conventional method, for example, as disclosed in Japanese Patent Appliction (OPI) No. 56508/77 (corresponding to U.S. Pat. No. 4,246,316). The ferromagnetic metal particles have a metal content of 75 wt % or more, preferably 80 wt % or more and more preferably 85 wt % or more, and at least 50 wt %, preferably at least 65 wt % and more preferably at least 75 wt % of the metal content is iron, which can additionally include one or more metals selected from cobalt, nickel, chromium, zinc, aluminum and manganese. Hydrogen, oxygen and nitrogen can also be included. The average particle size in the shorter axis is 150 to 500 Å, preferably 250 to 450 Å and more preferably 250 to 400 Å. The acicular ratio is in the range of 3 to 20, preferably 5 to 18 and more preferably 5 to 15. The saturation magnetization of ferromagnetic metal particles can be adjusted by the composition of the ferromagnetic metal particles, reducing conditions and the surface treatment which is to be carried out after the reduction reaction. The surface treatment is carried out using, for example, air, oxygen, nitrogen, ammonium gas and various oxidizing agents.

The coercive force of the ferromagnetic particles can be adjusted by the composition of the particles, the particle size and the shape thereof. The specific surface area measured by the BET method of the ferromagnetic metal particles which are obtained by reducing, for example, Goethite or acicular iron oxide with hydrogen, can be adjusted by selecting the specific surface area of the starting material, that is, by selecting the length of the particle, the acicular ratio and shape thereof.

The mixing ratio of the ferromagnetic metal particles and a binder used in the present invention is 100 parts by weight of ferromagnetic metal particles and 10 to 400, preferably 15 to 50 and more preferably 14 to 40 parts by weight of the binder.

Binders used in the present invention can be a known thermoplastic resin, a thermosetting resin, a reactive type resin or a mixture thereof.

The thermoplastic resin has a softening point of 150° C. or less, an average molecular weight of 10,000 to 20,000 and a degree of polymerization of about 200 to 500. Specific examples include a copolymer of vinyl chloride and vinyl acetate, a copolymer of vinyl chloride and vinylidene chloride, a copolymer of vinyl chloride and acrylonitrile, a copolymer of acrylate and acrylonitrile, a copolymer of acrylate and vinylidene chloride, a copolymer of acrylate and styrene, a copolymer of methacrylate and acrylonitrile, a copolymer of methacrylate and vinylidene chloride, a copolymer of methacrylate and styrene, an urethane elastomer, a nylon and silicone type resin, a nitrocellulose and polyamide resin, polyvinyl fluoride, a copolymer of vinylidene chloride and acrylonitrile, a copolymer of butadiene and acrylonitrile, a polyamide resin, polyvinyl butyral, a cellulose derivative (cellulose acetate butyrate, propionate, nitrocellulose and the like), a copolymer of styrene and butadiene, a polyester resin, a copolymer of chlorovinyl ether and acrylate, an amino resin, a thermoplastic resin of various synthetic rubber type and the mixtures thereof.

The thermosetting resin or the reactive type resin has a molecular weight of 200,000 or less in the state of a coating composition, but the molecular weight thereof becomes infinite by the reaction such as condensation reaction or addition reaction after coating and drying. Resins which do not soften or melt until resins are heat-decomposed are preferably used. Examples of resins include a phenol resin, an epoxy resin, a polyurethane hardenable resin, a urea resin, a melamine resin, an alkyd resin, a silicone resin, an acryl type reactive resin, an epoxy and polyamide resin, a nitrocellulose and melamine resin, a mixture of a high molecular weight polyester resin and isocyanate prepolymer, a mixture of a copolymer of methacrylate and a diisocyanate prepolymer, a mixture of polyester polyol and polyisocyanate, urea formaldehyde resin, a mixture of a low molecular weight glycol, a high molecular weight diol and triphenyl methane triisocyanate, a polyamide resin and the mixture thereof.

Examples of these resins are disclosed in U.S. Pat. No. 4,135,016.

In addition to the above described ferromagnetic metal particles and the binder, other additives such as a dispersing agent, a lubricating agent, an abrasive agent, an antistatic agent and a rust-preventing agent can be added to the magnetic layer.

The dispersing agents to be added to the magnetic layer include a fatty acid having 12 to 18 carbon atoms ($R_1COOH$, wherein $R_1$ is an alkyl group having 11 to 17 carbon atoms) such as capric acid, a caprylic acid, a lauric acid, a myristic acid, a palmitic acid, a stearic acid, an oleic acid, an elaidic acid, a linolic acid, a linolenic acid or a stearolic acid; a metal soap of an alkali metal (Li, Na, K and the like) or alkali earth metal (Mg, Ca, Ba) of the fatty acid; and lecithin. Higher alcohols having not less than 12 carbon atoms and sulfate can also be used. These dispersing agents can be used in an amount of 1 to 20, preferably 1 to 15 and more preferably 1 to 10 parts by weight based on 100 parts by weight of the binder.

The lubricating agents to be added to the magnetic layer include silicone oil, carbon black graft polymer, molybdenum disulfide, tungsten disulfide, a fatty acid ester of a monobasic fatty acid having 12 to 16 carbon atoms and a monovalent alcohol having 3 to 12 carbon atoms, and a fatty acid ester of a monobasic fatty acid having not less than 17 carbon atoms and a monovalent alcohol having 21 to 23 carbon atoms including carbon atoms of the said monobasic fatty acid. The lubricating agents can be used in an amount of 0.2 to 20, preferably 0.2 to 15 and more preferably 0.2 to 10 parts by weight based on 100 parts by weight of the ferromagnetic metal particles. These lubricating agents are disclosed in U.S. Pat. No. 4,135,016.

The abrasive agents used in the present invention are conventionally used agents such as a fused alumina, silicon carbide, chromium oxide, corundum, artificial corundum, diamond, artificial diamond, garnet, and emery (main components: corundum and magnetite) and the like. These abrasive agents have an average particle size of 0.05 to 5$\mu$, preferably 0.1 to 2$\mu$ and more preferably 0.1 to 1.5$\mu$. They are used in an amount of 0.1 to 20, preferably 0.1 to 15 and more preferably 1.0 to 10 parts by weight based on 100 parts by weight of the ferromagnetic metal particles. These abrasive agents are disclosed in U.S. Pat. No. 4,135,016.

The antistatic agents used in the present invention include a natural surface active agent such as saponin; a nonionic surface active agent such as alkylene oxide type agent, a glycerol type agent or glycidol type agent; a cationic surface active agent such as higher alkylamines, quarternary ammonium salts, pyridine and other heterocyclic compounds, phosphnium or sulfonium; an anionic surface active agent having an acid group such as a carboxylic acid, a sulfonic acid, a phosphoric acid, a sulfate, or a phophate group; and an amphoteric surfactant such as amino acids, amino sulphonic acids or a sulfate or phosphate of aminoalcohol. These surface active agents can be used alone or in combination. They can be used in an amount of 0 to 20, preferably 0 to 15 and more preferably 0 to 10 parts by weight based on 100 parts by weight of the ferromagnetic particles. The agents are used as an antistatic agent and are also used sometimes for improving the dispersion of the magnetic particles, magnetic characteristics, or lubricating properties, or as a coating aid.

Examples of the rust-preventing agents include those evaporating ones described in, for example, Japanese Patent Application (OPI) No. 63494/76, which can be used in an amount of 0 to 20, preferably 0 to 15 and more preferably 0 to 10 parts by weight based on 100 parts by weight of ferromagnetic particles.

A magnetic layer is prepared by coating a magnetic coating composition, dissolved in an orgnic solvent on a non-magnetic support.

Organic solvents used for coating a magnetic composition include ketones such as acetone, methyl ethyl ketone, methyl isobutyl ketone or cyclohexanone; alcohols such as methanol, ethanol, propanol or butanol; esters such as methyl acetate, ethyl acetate, butyl acetate, ethyl lactate or monoethyl ether or glycol acetate; glycol ethers such as ether, glycol dimethyl ether, glycol monoethyl ether or dioxane; tars (aromatic hydrocarbons) such as benzene, toluene or xylene, and chlorinated hydrocarbons such as methylene chloride, ethylene chloride, carbon tetrachloride, chloroform, ethylene chlorohydrin or dichlorobenzene.

The ferromagnetic metal particles, above described binders, dispersing agents, lubricating agents, abrasive agents, antistatic agents and solvents are mixed and kneaded to prepare a magnetic coating composition.

In mixing and kneading, the ferromagnetic metal particles and other compositions are simultaneously or separately in order put into a mixing and kneading device. For example, the ferromagnetic metal particles are added into a solvent containing a dispersing agent, mixed and kneaded for a predetermined period, and then the rest of the other compositions are added, while maintaining mixing and kneading to prepare a magnetic coating composition.

Various mixing and kneading devices are used for mixing, kneading and dispersing the compositions such as a two-roll mill, a three-roll mill, a ball mill, a pebble mill, a trommel, a sand grinder, a Szegvari attritor, a high speed impeller dispersing device, a high speed stone mill, a high speed impact mill, a disperser, a kneader, a high speed mixer, a homogenizer and an ultrasonic dispersing device.

The art of mixing, kneading and dispersing is disclosed in T. C. Patton, "Paint Flow and Pigment Dispersion" (1964, published by John Willey & Sons.), as well as in U.S. Pat. Nos. 2,581,414 and 2,855,156.

A method for coating a magnetic layer on a support includes an air doctor coating, a blade coating, an air knife coating, a squeeze coating, an impregnating coating, a reverse roll coating, a transfer roll coating, a gravure coating, a kiss coating, a cast coating and a spray coating method, and other coating methods can also be used. Detailed explanations are disclosed in "Coating Engineering" on pages 253 through 277 published by Asakura Shoten on Mar. 20, 1971.

The resulting magnetic layer having provided on a support is, if necessary, subjected to magnetic orientation of ferromagnetic metal particles contained therein and then followed by drying.

An alternative or direct current of about 500 to 5000 Oe is applied to the magnetic field for orientation, a drying temperature is about 50° to 120° C. and a drying time is about 0.5 to 10 minutes. If necessary, a magnetic layer can be subjected to a surface treatment or slit to a desired shape to prepare the magnetic recording medium of the present invention.

The present invention is further illustrated in more detail by the following non-limiting Examples and Comparative Examples. All parts are by weight.

EXAMPLE

Goethite adsorbed by nickel and cobalt and having various BET specific surface areas were heat-treated at 600° to 750° C. to prepare Fe type acicular oxides, which were then reduced by hydrogen at 300° to 400° C. to obtain Fe type ferromagnetic metal particles.

The ferromagnetic metal particles were soaked in toluene, and placed in air to evaporate the toluene by adjusting the concentration of oxygen so as to obtain ferromagnetic metal particles Samples No. M-1 through M-9.

A magnetic coating composition was prepared using the above ferromagnetic metal particles and the following composition.

| | |
|---|---|
| Ferromagnetic metal particles (Characteristics are shown in Table 1) | 100 parts |
| Copolymer of vinyl chloride, vinyl acetate and vinyl alcohol (91/3/6 wt %; degree of polymerization: about 400) | 10 parts |
| Polyester polyurethane (Molecular weight about 130,000; a reaction product of ethylene adipate and 2,4-tolylenediisocyanate) | 6 parts |
| Carbon black (Average particle diameter 20 mμ) | 1 part |
| Oleic acid | 2 parts |
| β-Al$_2$O$_3$ (Average particle diameter 0.4μ) | 3 parts |
| Methyl ethyl ketone | 150 parts |
| Cyclohexanone | 150 parts |

The above composition was mixed and kneaded in a ball mill for 5 hours, and dispersed by a sand grinder for 1 hour, and 4 parts by weight of a triisocyanate compound (trade name, "Coronate L", manufactured by Nippon Polyurethane Co., Ltd.) were added thereto. The resulting composition was dispersed by a high speed shearing force for 30 minutes to prepare a magnetic coating composition.

Magnetic coating compositions A, B, C, D and E were coated on one surface of a polyethylene terephthalate film having a thickness of 75μ and having a surface roughness Ra of 0.05μ, and then were subjected to a magnetic orientation with about 3,500 Oe, heated and dried. The thus-obtained magnetic web was subjected to calendaring treatment, then coated with a magnetic coating composition seleced from the compositions E, F, G, H and I, charged in a magnetic field having a current of about 3,500 Oe and was heated and dried. The magnetic web was again subjected to calendering treatment, and slit into a width of 3.8 mm to prepare cassette tapes. In these processes, the conditions were varied as shown in Table 2 to prepare cassette tapes having various characteristics. Typical B-H characteristics and electromagnetic properties of the samples in the Examples and Comparative Examples are shown in Tables 2 and 3.

TABLE 1

| Ferromagnetic Metal Particle No. | Coercive Force (Hc) (Oe) | Saturation Demagnetization (σs) (emu/g) | BET Specific Surface Area (m$^2$/g) | Magnetic Coating Composition |
|---|---|---|---|---|
| M-1 | 600 | 155 | 23 | A |
| M-2 | 610 | 139 | 29 | B |
| M-3 | 690 | 145 | 26 | C |
| M-4 | 720 | 138 | 26 | D |
| M-5 | 780 | 129 | 24 | E |
| M-6 | 820 | 135 | 30 | F |
| M-7 | 870 | 130 | 34 | G |
| M-8 | 880 | 128 | 38 | H |
| M-9 | 950 | 132 | 33 | I |

TABLE 2

| | Under Magnetic Layer | | | | Upper Magnetic Layer | | | Whole Magnetic Layer including Upper and Under Layers | | | | | |
|---|---|---|---|---|---|---|---|---|---|---|---|---|---|
| Tape Sample | Magnetic Coating Composition | Hc (Oe) | Br (Gauss) | φr (MAXWELL/cm) | Thickness (μm) | Magnetic Coating Composition | Hc (Oe) | Thickness (μm) | Hc (Oe) | Br (Gauss) | Br/Bm | Thickness (μm) | Surface Gloss % | ΔBr (%) |
| T-1 | A | 550 | 3400 | 1.19 | 3.5 | F | 740 | 1.0 | 570 | 3250 | 0.90 | 4.5 | 75 | 4.8 |
| T-2 | A | 550 | 3300 | 0.99 | 3.0 | G | 790 | 1.0 | 600 | 3150 | 0.88 | 4.0 | 85 | 6.3 |
| T-3 | A | 550 | 3400 | 1.33 | 3.9 | G | 790 | 1.0 | 610 | 3150 | 0.89 | 4.9 | 81 | 6.3 |
| T-4 | A | 540 | 3350 | 1.01 | 3.0 | I | 880 | 1.4 | 640 | 3100 | 0.87 | 4.4 | 102 | 6.0 |
| T-5 | B | 560 | 3000 | 0.84 | 2.8 | G | 800 | 2.0 | 630 | 2800 | 0.85 | 4.8 | 90 | 6.5 |
| T-6 | B | 560 | 3000 | 0.90 | 3.0 | H | 800 | 1.4 | 620 | 2650 | 0.80 | 4.4 | 95 | 12.2 |
| T-7 | C | 610 | 3200 | 0.48 | 1.5 | G | 790 | 1.4 | 650 | 3000 | 0.84 | 2.9 | 84 | 6.3 |
| T-8 | C | 610 | 3250 | 0.49 | 1.5 | G | 800 | 2.8 | 680 | 2950 | 0.84 | 4.3 | 100 | 6.6 |
| T-9 | C | 610 | 3200 | 0.96 | 3.0 | G | 790 | 1.4 | 640 | 3000 | 0.85 | 4.4 | 80 | 6.1 |
| T-10 | C | 620 | 3150 | 1.45 | 4.5 | G | 790 | 1.4 | 660 | 2950 | 0.86 | 5.9 | 70 | 6.2 |
| T-11 | D | 650 | 3000 | 0.90 | 3.0 | E | 700 | 1.4 | 660 | 2800 | 0.85 | 4.4 | 75 | 3.0 |
| T-12 | D | 650 | 3050 | 0.73 | 2.4 | F | 740 | 2.4 | 680 | 2900 | 0.82 | 4.8 | 45 | 5.8 |
| T-13 | D | 650 | 3050 | 0.76 | 2.5 | F | 750 | 2.2 | 680 | 2900 | 0.83 | 4.7 | 57 | 5.5 |
| T-14 | E | 690 | 2800 | 0.84 | 3.0 | F | 750 | 1.4 | 700 | 2700 | 0.84 | 4.4 | 64 | 5.2 |
| T-15 | E | 690 | 2800 | 0.98 | 3.5 | G | 800 | 1.0 | 720 | 2650 | 0.85 | 4.5 | 82 | 6.2 |

TABLE 2-continued

| | Under Magnetic Layer | | | | | Upper Magnetic Layer | | | Whole Magnetic Layer including Upper and Under Layers | | | | | |
| --- | --- | --- | --- | --- | --- | --- | --- | --- | --- | --- | --- | --- | --- | --- |
| Tape Sample | Magnetic Coating Composition | Hc (Oe) | Br (Gauss) | $\phi r$ $\left(\dfrac{\text{MAX-WELL}}{\text{cm}}\right)$ | Thickness ($\mu$m) | Magnetic Coating Composition | Hc (Oe) | Thickness ($\mu$m) | Hc (Oe) | Br (Gauss) | Br/Bm | Thickness ($\mu$m) | Surface Gloss % | $\Delta$Br (%) |
| T-16 | E | 690 | 2800 | 0.22 | 0.8 | G | 800 | 2.3 | 750 | 2750 | 0.83 | 3.1 | 97 | 6.4 |

TABLE 3

| | Electromagnetic Properties | | | | | | |
| --- | --- | --- | --- | --- | --- | --- | --- |
| Tape Sample | 315 Hz Sensitivity (dB) | 10 KHz Frequency Characteristic (dB) | 315 Hz MOL (dB) | 6.3 KHz MOL (dB) | 10 KHz SOL (dB) | Bias Noise (dB) | Total Dynamic Range (dB) |
| T-1 | +4.0 | −2.5 | +5.8 | +4.0 | +2.2 | −0.4 | +4.4 |
| T-2 | +3.0 | −0.5 | +4.6 | +3.8 | +4.0 | −0.5 | +4.8 |
| T-3 | +3.3 | −0.9 | +4.9 | +4.1 | +4.0 | −0.5 | +5.0 |
| T-4 | +3.6 | +1.2 | +5.1 | +2.0 | +6.5 | −0.6 | +6.4 |
| T-5 | +2.6 | 0.0 | +4.0 | +3.8 | +4.1 | −0.7 | +4.8 |
| T-6 | +2.3 | +0.7 | +3.6 | +4.0 | +4.5 | −1.0 | +5.1 |
| T-7 | +1.7 | +1.7 | +2.9 | +3.0 | +5.2 | −0.5 | +4.6 |
| T-8 | +1.4 | +2.0 | +2.5 | +3.7 | +5.5 | −0.5 | +4.5 |
| T-9 | +2.6 | +1.0 | +4.3 | +4.2 | +5.8 | −0.5 | +5.6 |
| T-10 | +2.9 | −1.5 | +4.5 | +3.8 | +2.8 | −0.6 | +4.3 |
| T-11 | +3.0 | −0.9 | +4.2 | +3.5 | +3.0 | +1.2 | +2.4 |
| T-12 | +2.4 | −1.8 | +3.9 | +2.0 | +1.2 | −0.4 | +3.0 |
| T-13 | +2.5 | +0.2 | +3.8 | +3.9 | +4.1 | −0.4 | +4.4 |
| T-14 | +2.5 | +0.1 | +4.1 | +3.9 | +4.1 | −0.3 | +4.4 |
| T-15 | +2.6 | +0.8 | +3.1 | +4.2 | +5.2 | −0.5 | +4.7 |
| T-16 | +1.8 | +1.6 | +2.8 | +3.7 | +5.0 | −0.5 | +4.4 |

The values of the characteristics shown in Tables 1 through 3 were obtained in the following manner.

(a) Coercive force (Hc)

The values were measured in a magnetic field (Hm) of 2 KOe.

(b) Saturation magnetization ($\sigma$s)

The values were measured in a magnetic field (Hm) of 10 KOe.

(c) Residual magnetic flux density (Br)

The values were measured in a magnetic field (Hm) of 2 KOe.

(d) Residual flux ($\phi$r)

The values were measured in a magnetic field (Hm) of 2 KOe.

(e) Surface gloss

The values were measured at an angle of 45° using a cassette type digital gloss meter "GK-45D" (trade name) manufactured by Suga Shikenki Co., Ltd.

(f) $\Delta$Br

This stands for demagnetization, which was shown by the following equation, $\Delta Br = (1 - Br'/Br) \times 100$, wherein Br' is the residual magnetic flux density of samples which had been allowed to stand at 60° C. and 90% RH for 7 days.

(g) Electromagnetic properties

An audio tape recorder (deck), "Nakamichi 582" was used at a high position.

In Tables 2, 0 dB was the value of a cassette tape "FR-II" (trade name) manufactured by Fuji Photo Film Co., Ltd. suitable for high position level of an audio tape recorder.

MOL is the maximum output level when the haromonic distortion factor was 3%.

SOL is the saturated output level at 10 KHz.

Bias noise is an output level of samples which had passed through an audio correction circuit.

Total dynamic range is represented by [(315 Hz MOL+10 KHz SOL)×½−bias noise]

In Tables 2 and 3, Sample Nos. T-2, T-3, T-5, T-9, T-12 through T-16 are examples of the present invention. They have better frequency characteristics, SOL, MOL and balance of bias noise, and the total dynamic range is high. Therefore, the effect of the multi-layer structure is sufficiently obtained. In the examples of the present invention, when the surface gloss of a tape is low (Sample No. T-12), the frequency characteristic is low, and SOL 10 KHz is also low, thereby losing the balance of frequency. When the thickness of the under magnetic layer is thinner as in Sample No. T-16, the output at a low frequency region is low and the balance of frequency tends to be lost.

Comparative examples are discussed hereinafter.

Regarding Sample No. T-1, the coercive force of the upper magnetic layer is within the range of the present invention, but the coercive force of the entire magnetic layer is outside of the range of the present invention which is less than the minimum limit. As a result, the output of the low frequency region (MOL 315 Hz) was sufficient, but the frequency characteristics is markedly poor and the balance of the frequency characteristics is poor.

Regarding Sample No. T-4, the coercive force of the entire magnetic layer falls within the range of the present invention, but the difference of the coercive force between the upper magnetic layer and the under magnetic layer is too large and then coercive force of both layers falls outside the range of the present invention. As a result, the output at the low and high frequency regions is excellent, but the output at the middle frequency region (6.3 KHz MOL) is not so excellent, and balance of the frequency characteristics is deteriorated.

Regarding Sample No. T-6, the specific surface area of the ferromagnetic metal particles contained in the upper magnetic layer is outside of the present invention which is over the upper limit. As a result, demagnetization ΔBr is large and the stability with the passage of time is deteriorated. That is, the initial characteristics are excellent, but are deteriorated after a long period of storage, which thereby causes the problem of quality stability.

Regarding Sample No. T-7, the thickness of the entire magnetic layer is lower than the range of the present invention, and the output at the low frequency region is reduced.

Regarding Sample No. T-8, the thickness of the upper magnetic layer is higher than the range of the present invention, and the output at the low frequency region is reduced and the balance of the frequency characteristic tends to be lost.

Regarding Sample No. T-10, the thickness of the entire magnetic layer is outside the range of the present invention, the output at the high frequency region is reduced, the frequency characteristics are poor and the balance of the frequency characteristics is deteriorated. Since a large amount of magnetic coating composition was required, this sample is not preferred in terms of industrial scale production.

Regarding Sample No. T-11, the specific surface area of the ferromagnetic metal particles contained in the upper magnetic layer is lower than the range of the present invention, bias noise is large, the dynamic range is low and the effect of the present invention could not be obtained.

While the invention has been described in detail and with reference to specific embodiment thereof, it will be apparent to one skilled in the art that various changes and modifications can be made therein without departing from the spirit and scope thereof.

What is claimed is:

1. A magnetic recording medium, comprising:
   a non-magnetic support having coated thereon two magnetic layers;
   wherein the under layer of the magnetic layers contains ferromagnetic metal particles having a coercive force of 550 to 700 Oe, and a saturation magnetization of from 130 to 170 emu/g;
   wherein the upper layer of the magnetic layers contains ferromagnetic metal particles having a specific surface area determined by the BET method of 25 to 35 m$^2$/g, a coercive force of 700 to 800 Oe and a thickness of 0.5 to 2.5 μm and has a degree of surface gloss of not less than 50, and
   wherein the entire magnetic layer including the upper layer and the under layer has a coercive force of 580 to 750 Oe, a residual magnetic flux density of 2200 to 3200 gauss and a thickness of 3.0 to 5.0 μm.

2. The magnetic recording medium as claimed in claim 1, wherein said ferromagnetic metal particles in the under magnetic layer have a coercive force of 550 to 690 Oe.

3. The magnetic recording medium as claimed in claim 1, wherein said under magnetic layer has a thickness of 2.0 to 4.5 μm.

4. The magnetic recording medium as claimed in claim 3, wherein said under magnetic layer has a thickness of 2.0 to 4.0 μm.

5. The magnetic recording medium as claimed in claim 1, wherein said under magnetic layer has a residual magnetic flux of 0.5 to 1.5 MAXWELL/cm.

6. The magnetic recording medium as claimed in claim 5, wherein said under magnetic layer has a residual magnetic flux of 0.8 to 1.3 MAXWELL/cm.

7. The magnetic recording medium as claimed in claim 1, wherein said ferromagnetic metal particles in the under magnetic layer have a specific surface area by the BET method of 20 to 30 m$^2$/g.

8. The magnetic recording medium as claimed in claim 7, wherein said ferromagnetic metal particles in the under magnetic layer have a specific surface area by the BET method of 23 to 30 m$^2$/g.

9. The magnetic recording medium as claimed in claim 8, wherein said ferromagnetic metal particles in the upper magnetic layer have a specific surface area of 25 to 35 m$^2$/g.

10. The magnetic recording medium as claimed in claim 9, wherein said specific surface area is 28 to 35 m$^2$/g.

11. The magnetic recording medium as claimed in claim 10, wherein said specific surface area is 30 to 35 m$^2$/g.

12. The magnetic recording medium as claimed in claim 1, wherein said ferromagnetic metal particles in the upper magnetic layer have a coercive force of 720 to 800 Oe.

13. The magnetic recording medium as claimed in claim 12, wherein said ferromagnetic metal particles in the upper magnetic layer have a coercive force of 730 to 800 Oe.

14. The magnetic recording medium as claimed in claim 1, wherein said upper magnetic layer has a degree of surface gloss of not less than 80.

15. The magnetic recording medium as claimed in claim 1, wherein said entire magnetic layer has a coercive force of 590 to 740 Oe.

16. The magnetic recording medium as claimed in claim 1, wherein said entire magnetic layer has a coercive force of 600 to 720 Oe.

17. The magnetic recording medium as claimed in claim 1, wherein said residual magnetic flux density is 2200 to 3100 gauss.

18. The magnetic recording medium as claimed in claim 1, wherein said residual magnetic flux density is 2300 to 3000 gauss.

19. The magnetic recording medium as claimed in claim 1, wherein the squareness ratio of said entire magnetic layer is 0.80 or more.

20. The magnetic recording medium as claimed in claim 19, wherein the squareness ratio of said entire magnetic layer is 0.82 or more.

21. The magnetic recording medium as claimed in claim 20, wherein the squareness ratio of said entire magnetic layer is 0.85 or more.

22. The magnetic recording medium as claimed in claim 1, wherein said entire magnetic layer has a thickness of 3.0 to 4.8 μm.

23. The magnetic recording medium as claimed in claim 1, wherein the ferromagnetic metal particles of the upper layer have a metal content of 75 wt % or more and at least 50 wt % of the metal content is iron and wherein the ferromagnetic metal particles of the under layer have a metal content of 75 wt % or more and at least 50 wt % of the metal content is iron.

24. The magnetic recording medium as claimed in claim 1, wherein the ferromagnetic metal particles of the upper layer have a metal content of 80 wt % or more and at least 65 wt % of the metal content is iron and wherein the ferromagnetic metal particles of the under layer have a metal content of 80 wt % or more and at least 65 wt % of the metal content is iron.

25. The magnetic recording medium as claimed in claim 1, wherein the ferromagnetic metal particles of the upper layer have a metal content of 85 wt % or more and at least 75 wt % of the metal content is iron and wherein the ferromagnetic metal particles of the under layer have a metal content of 85 wt % or more and at least 75 wt % of the metal content is iron.

* * * * *